June 3, 1958  V. AZGAPETIAN  2,837,733
WIDE RANGE MEASURING OR CONTROL SYSTEM
Filed Dec. 17, 1953
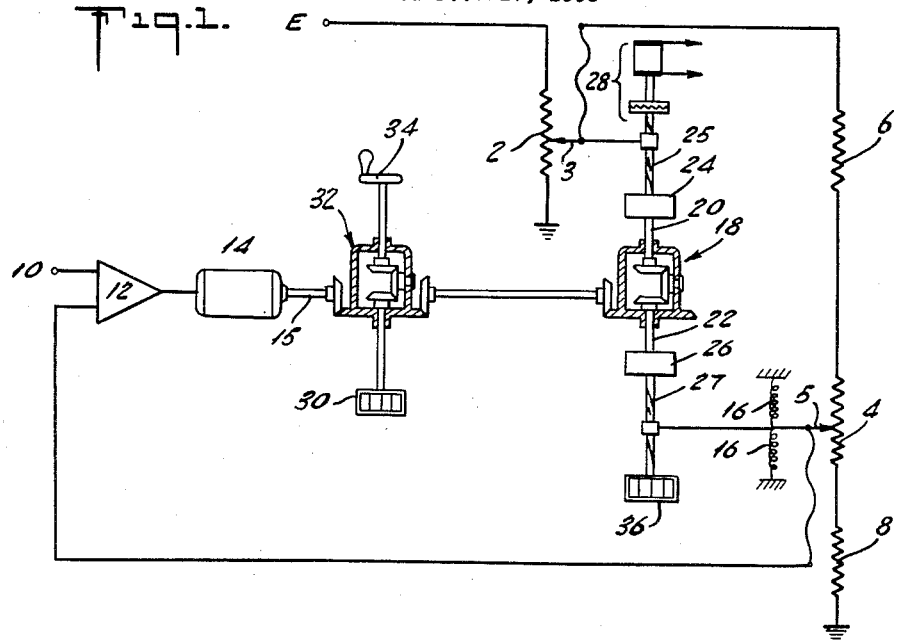
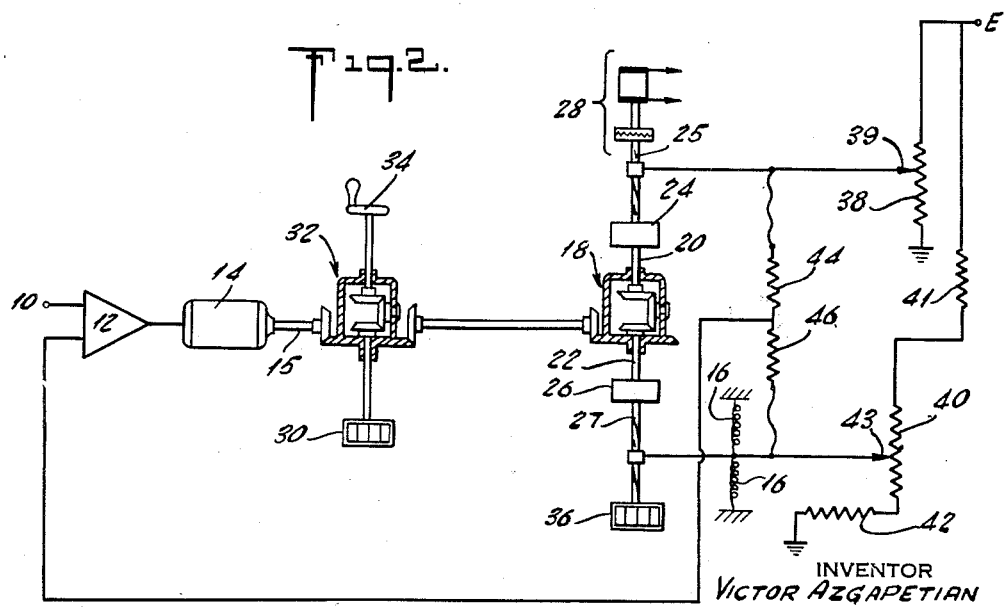
INVENTOR
VICTOR AZGAPETIAN
BY
Eyre, Mann & Burrows
ATTORNEYS

United States Patent Office 2,837,733
Patented June 3, 1958

2,837,733

WIDE RANGE MEASURING OR CONTROL SYSTEM

Victor Azgapetian, Roslyn Heights, N. Y., assignor to Servomechanisms Inc., a corporation of New York Application December 17, 1953, Serial No. 398,692

11 Claims. (Cl. 340—187)

The present invention relates to mechanico-electrical indicating or control systems of the type employed in computers, servomechanisms, or the like, and comprises an improved indicating or control system wherein the accuracy over any desired fraction of the total range of operation is at least as high as would be the case were such fraction the entire working range of the instrument. In mechanico-electrical indicating or control systems it is ordinarily necessary that a source of voltage be accurately divided, that is, that a certain specific fraction of a voltage be taken and delivered as an output signal. Typical of devices of this type are potentiometers and synchros. The accuracy of any such device is limited by the range over which it is required that it operate as the ultimate position of the take-off element is a fraction of the total range. If the instrument is to yield but a single output signal, accuracy may be required only over a small fraction of the total range of operation, but such fraction may occur anywhere in the wider range.

The system of the present invention operates in effect to magnify any selected portion of the range of operation of a device and provide for such selected portion an accuracy which is of the order obtainable in a device having a total range of operation equal to the selected portion over which the higher accuracy is desired. More specifically, the invention provides two mechanico-electrical converters yielding a common output signal and a mechanical switch for impressing a mechanical input signal on one or the other of the converters for selection of the portion of the total range over which accurate operation is desired. The total excursion of the input element of one converter corresponds to the total range over which indications of a condition are to be obtained while the total excursion of the input element of the other converter corresponds to a relatively small fraction of such range. The mechanical input signal to the converters may be a shaft rotation resulting from operation of a servomotor and the converters may be potentiometers, the wipers of which are positioned in accordance with such shaft rotation to yield an electrical output feedback signal to the servomotor. Thus, by means of the mechanical switch the wiper of the potentiometer corresponding to a portion of the range can be locked until the wiper of the other potentiometer is in a position corresponding to a point within the portion of the range over which precise indications are desired. The switch can then be operated to lock the wiper of the last mentioned potentiometer and to release the other whereby excursions of the latter will measure with higher accuracy variations above and below the point at which the total range wiper is locked.

For a better understanding of the invention and of specific embodiments thereof, reference may be had to the accompanying drawings of which:

Fig. 1 is a schematic diagram of a system embodying the invention and particularly suitable for use in altitude measurement, and Fig. 2 is a similar diagram illustrating a different arrangement of the converters.

In Fig. 1 a wide range potentiometer is indicated at 2 with its wiper at 3 and a narrow range potentiometer is indicated at 4 with its wiper at 5. These potentiometers may be linear or tapered according to the particular application. In this particular embodiment of the invention the potentiometers are connected in tandem across a source of constant voltage E, the wiper 3 being connected through a fixed resistor 6 to one end of potentiometer 4, the other end of which is connected to ground through a fixed resistor 8. The input signal, which may comprise a voltage varying, for example, with a pressure indicative of altitude of an aircraft, is impressed upon the input terminal 10 and that signal, together with a feedback signal from the wiper 5 of potentiometer 4 is impressed upon the input terminals of a servo amplifier 12, the output of which controls a servomotor 14 in known manner. The shaft 15 of servomotor 14 is coupled through differential gearing and gear reduction mechanisms to each of the wipers 3 and 5 to cause movement of one or the other of the wipers when the input and feedback signals differ. When an indication anywhere in the total range of operation corresponding to potentiometer 2 is desired, rotation of the motor shaft moves wiper 3 and wiper 5 is held fixed substantially at the mid-point of potentiometer 4 by any suitable means as, for example, the opposed springs diagrammatically shown at 16. When accurate operation over any specific fraction of the total range of the instrument is desired, wiper 3 is held constant and the servomotor shaft drives wiper 5 against the resistance of the springs 16. To effect this operation the motor shaft is coupled through a summing differential 18 to shafts 20 and 22, the former of which through a suitable gear reduction mechanism 24, drives shaft 25 controlling wiper 3 and the latter of which, through a suitable gear reduction 26, drives the shaft 27 controlling wiper 5. During the period when wiper 3 alone is to be driven, the braking action of the springs 16 on the shaft 27 is sufficient to hold that shaft stationary and cause the motor shaft to drive shafts 20 and 25 and wiper 3. When operation over a limited range above and below that corresponding to the position at any moment of wiper 3 is desired, shaft 25 is braked by the operator, as by means of a solenoid operated brake 28, causing the shaft of the servomotor to drive wiper 5 through the summing differential 18. As the rotation of the shaft 15 is of the servomotor is an indication of the input signal, indicating means, such as a counter 30, may be coupled directly to the shaft. Preferably, however, in order to permit manual setting of the counter independently of shaft position, the counter 30 is coupled to the shaft through a differential 32 and an operator-controlled means 34 for setting the counter to any desired indication is coupled to the counter through the differential.

When the system above briefly described is to be used for recording or indicating the altitude of an aircraft and it is desired that the aircraft fly at a predetermined altitude and be accurately maintained at or near such altitude, the operator of the airplane causes the airplane to ascent until the counter 30 indicates that the altitude as measured by the position of wiper 3 on potentiometer 2 is substantially that desired. He then, while maintaining constant altitude, sets the counter 30, by means of the manual control 34, to the exact altitude as learned from the radar equipment on the airplane, and energizes the solenoid-operated brake 28 to lock shafts 20 and 25 and wiper 3. When the shaft 20 is locked, any rotation of the shaft 15 of the servomotor 14 resulting from change in altitude of the airplane, causes movement of wiper 5 against the resistance of the springs 16, the wiper coming to rest when its position yields a feedback signal equal to the signal impressed on terminal 10. By means of a counter 36 coupled to the shaft 27 of wiper 5 and suitably calibrated, the exact altitude above or below that existing at the moment of switching can be read, whereas the total exact altitude can be read from counter 30. When the brake 28 is released at the end of a period of precise flying, the springs 16 return wiper 5 to its original position and the rotation of shaft 22 occasioned thereby causes movement of wiper 3 in one direction or the other to the position to compensate for the change in feedback voltage occurring as a result of the return of wiper 5. Exact compensation is obtained by selection of gear ratios of the reduction gears 24 and 26 such that the feet of altitude per revolution of each of shafts 20 and 22 is the same. For example, if one revolution of shafts 15, 20 and 22 is to correspond to 10 feet of altitude, if the total range over which altitude is to be measured is 100,000 feet and accurate measurement over any 2,000 foot portion of the range is desired, then gear reductions 24 and 26 should be such that for each revolution of shaft 15 when brake 28 is deenergized, shaft 25 rotates one ten-thousandth of a rotation and shaft 27, when brake 28 is energized, rotates one-hundredth of a rotation.

Exact compensation is not essential, however, as any change in feedback voltage arising from failure of wiper 3 to move into a position to compensate exactly for the return of wiper 5 to its original position merely means that the servomotor will be actuated to compensate for any difference in gear ratios from that affording perfect mechanical compensation.

The above described system of Fig. 1 is particularly suitable for altitude measurement for the reason that a percent increase in pressure gives a fixed increase in altitude and, therefore, by connecting the potentiometers in tandem a definite change in the position of wiper 5 always corresponds to the same number of feet difference in altitude, irrespective of the position of wiper 3, provided potentiometer 4 is tapered to give logarithmic change in potential at its wiper with linear change in wiper position. Potentiometer 2 should, of course, be similarly tapered.

It will be understood that for precise altitude measurement corrections are needed for temperature and other atmospheric conditions. There are various known ways in which such corrections may be introduced. For example, the input signal applied to terminal 10 could include such correction, or the correction to be applied to the reading of counter 30 could be determined from tables. Alternatively the shaft position controlling counter 30 could be converted to an electrical signal and that signal corrected to yield precise altitude measurement.

Although in the foregoing description of the operation of the system when employed for altitude measurement, the availability of other equipment for obtaining from time to time exact measurements for calibration of the counter 30 has been assumed, it is not essential that such other equipment be available as irrespective of the accuracy of correlation between the setting of wiper 3 and the altitude, excursions of wiper 5 to one side or the other of its neutral position will yield accurate indications of the change in altitude from that at which the airplane was flying at the moment when the solenoid brake was operated. Hence the equipment can be employed to minimize, and measure with high accuracy, variations from constant altitude flying even when the accuracy of measurement of the total altitude is no better than that afforded by the wide range potentiometer 2. When radar equipment is available, not only will accurate indications of altitude variations be given by counter 36, as in the case when no radar equipment is available, but accurate indication of total altitude is continuously available at counter 30.

In Fig. 2 is illustrated a system embodying the invention wherein the coarse and fine range potentiometers comprising the mechanico-electrical converters are connected in parallel instead of in tandem as in Fig. 1. This arrangement while not being as specifically adapted for use in measurement of altitude as that of Fig. 1, has a more general field of application. The system of Fig. 2 could be used, for example, to detect and measure small variations from any temperature within a wide range and, if desired, to provide a regulator therefor. Other applications of the system will be apparent.

For convenience and clarity the system of Fig. 2 has been illustrated as of the same general type as that of Fig. 1 and as including similar instrumentalities identified by like reference numerals. In each figure, the system is shown as comprising a servo amplifier for creation of an error signal, a servomotor energized thereby and with its shaft coupled to the wipers of two potentiometers through calibrating and summing differentials and gear reduction mechanisms, and in each spring means are illustrated for holding fixed the wiper of the fine range potentiometer when the wiper of the coarse range potentiometer is to be moved and a solenoid operated brake for the shaft of the latter wiper has been illustrated when accurate measurements over a small range are to be made.

In Fig. 2 the wide range potentiometer 38 is connected across the source E and the fine range potentiometer 40, preferably connected in series with two resistors 41 and 42 is likewise connected across the source E. The resistance of potentiometer 38 may be equal to that of potentiometer 40 or to the sum of potentiometer 40 and resistors 41 and 42, or the potentiometers may have unequal resistances. The wipers 39 and 43 of the respective potentiometers 38 and 40 are connected together through resistors 44 and 46 each of which has a resistance substantially higher than that of either potentiometer. The feedback signal to the servo amplifier for comparison with an incoming signal impressed upon terminal 10, is taken from the junction of resistors 44 and 46.

As in the system of Fig. 1, the output error signal from the amplifier 10 is impressed upon the servomotor 14 to cause rotation of the shaft 15 thereof and movement of one or the other of the wipers 39 and 43, wiper 43 being held against movement by suitable spring means when wiper 39 is unbraked and wiper 39 being locked by the solenoid operated brake 28 when shaft 15 is to drive wiper 43. The gear ratios and the ratio of resistances 44 and 46 are preferably so selected as to provide mechanical compensation as in the case of the system of Fig. 1. For example, if the system of Fig. 2 is to be used for measurement of temperature over a total range of say 1000° F. and therefore one complete revolution of the shaft 25 controlling wiper 39 covers this range and if it is desired to measure accurately a range of 10° F. above and below any temperature within the total range so that one complete revolution in either direction of shaft 27 controlling wiper 43 covers 10°, then the gear reductions 24 and 26 should be so chosen that one revolution of shaft 27 corresponds to one one-hundredth of a revolution of shaft 25 and the resistance of resistor 46 should be one hundred times that of resistor 44. The counter 36 driven by shaft 27 can be calibrated in fractions of degrees, to yield temperature differences and the counter 30 driven from the motor shaft can be calibrated to yield total temperature. If desired, as in the system of Fig. 1, manual means for calibrating counter 30 through the calibrating differential 32 may be provided.

The invention has now been described and two embodiments thereof have been diagrammatically illustrated. No attempt has been made to indicate mechanical details of the various instrumentalities usable in the new system as such instrumentalities are well known in the art and, per se, form no part of the present invention. For example, servo amplifiers containing means for comparing control and feedback electrical signals, including means for yielding an alternating current signal for operating a servomotor are known and available commercially, as are also summing differentials, gear reduction mechanisms, potentiometers with shaft-driven wipers and solenoid operated or other type brakes. Obviously, a wide variety of specific mechanisms could be employed and the invention could be employed in the measurement of a wide variety of conditions. Although emphasis has been placed in the description on the use of the new system in measuring variations within different selected portions of a total range, obviously regulation, as well as measurement, comes within the field of utility of the invention as a shaft rotation, or the like, yielding a feedback signal, can always be used for regulating purposes as is customary in the art. Although but two specific arrangements of the two mechanico-electrical converters have been described, other connections of potentiometers or equivalent mechanico-electrical converters suitable for use in the new system will occur to those skilled in the art.

The following is claimed:

1. In a system for measuring over a wide range the condition of a variable and for yielding an electrical output signal indicative of such condition, the combination comprising a first mechanico-electrical converter having a mechanical input element the total excursion of which corresponds to the total range over which the condition of the variable is to be measured, a second mechanico-electrical converter having a mechanical input element the total excursion of which corresponds to a fraction of such range, means for combining the electrical outputs of said converters to yield a single electrical output signal and mechanical means for optionally impressing an input signal responsive to the condition of the variable on one or the other of said mechanical input elements whereby, when said means are operated to transfer the input signal from the input element of said first converter to the input element of said second converter, change in condition of the variable from that corresponding to the position of the input element of said first converter will be accurately measured throughout the fraction of the total range corresponding to total excursion of the input element of said second converter.

2. The combination according to claim 1 wherein the input elements of said converters are rotatable shafts coupled through a summing differential to each other and to a third shaft the rotation of which is controlled by the input signal and wherein said mechanical means comprise an externally-controlled brake for the shaft of said first converter and biasing means tending to hold the shaft of said second converter at a given point of its range.

3. The combination according to claim 2 including mechanical means interposed between the shafts of said converters to insure movement of the shaft of the first converter upon release of said brake into a position to mechanically compensate for return of the shaft of said second converter by said biasing means to the given point of its range.

4. The combination according to claim 1 wherein said converters are potentiometers, the first potentiometer being connected across a source of operating potential and the second potentiometer being connected across the fraction of such source determined by the wiper of the first potentiometer, whereby the output signal from the wiper of said second converter is indicative of altitude.

5. The combination according to claim 1 wherein said converters are potentiometers connected in parallel.

6. The combination according to claim 1 wherein the input elements of said converters are rotatable shafts coupled through a summing differential to each other and to a third shaft the rotation of which is controlled by the input signal, wherein said mechanical means comprise an externally-controlled brake for the shaft of said first converter and biasing means tending to hold the shaft of said second converter at a given point in its range, and including an indicator coupled to said third shaft and means for setting said indicator independently of said third shaft whereby, when the shaft of said first converter is locked, the accuracy of said indicator depends only upon the accuracy of such setting and the accuracy of said second converter.

7. A system for yielding an electrical output signal indicative of altitude and having an accuracy over any selected portion of a total altitude range to be measured as high as would be obtainable were such portion the entire range to be covered, which comprises electromechanical means for comparing an electrical input signal varying as a function of altitude with an electrical feedback signal to yield a shaft rotation, a first potentiometer having a wiper the total excursion of which corresponds to the total altitude range to be measured, a second potentiometer having a wiper the total excursion of which corresponds to a fraction of such range and the potential of the wiper of which provides the feedback signal, said first potentiometer being connected across a source of operating potential and said second potentiometer being connected across the fraction of such source determined by the position of the wiper of the first potentiometer, a summing differential coupling said wipers and driven by the output shaft rotation of said electromechanical means, means biasing the wiper of said second potentiometer into a predetermined position and an externally-controlled brake for the wiper of said first potentiometer whereby when said brake is released the wiper of said first potentiometer only is driven by said shaft rotation and when said brake is operated the shaft rotation drives the wiper of said second potentiometer against said biasing means.

8. The system according to claim 7 including an indicator coupled to the output of said electro-mechanical means and means for setting said indicator independently of said output whereby the accuracy of said indicator when the wiper of said first potentiometer is braked will depend only upon such setting and upon the accuracy of said second potentiometer.

9. In a system for measuring over a wide range the condition of a variable and for yielding an electrical output signal indicative of such condition, the combination comprising a first mechanico-electrical converter having a mechanical input element the total excursion of which corresponds to the total range over which the condition of the variable is to be measured, a second mechanico-electrical converter having a mechanical input element the total excursion of which corresponds to a fraction of such range, means for combining the electrical outputs of said converters to yield a single electrical output signal, mechanical means including reduction mechanisms coupling said input elements, means responsive to an input signal for driving said elements through said mechanical means and means independent of the input signal for locking one or the other of said input elements to cause movement of the other in response to the input signal, said mechanical means determining the ratio of the excursions of said input elements corresponding to a given change in the input signal.

10. The combination according to claim 9 wherein the ratio of the excursion of the input element of the second converter to the excursion of the input element of the first converter for a given change in input signal is substantially the same as the ratio of the total excursion of the input element of the first converter to one-half the total excursion of the input element of the second converter.

11. The combination according to claim 1 wherein the input elements of said converters are rotatable shafts coupled through a summing differential to each other and to a third shaft the rotation of which is controlled by the input signal, wherein said mechanical means comprise an externally-controlled brake for the shaft of said first converter and biasing means tending to hold the shaft of said second converter at a given point in its range, and including an indicator coupled to the shaft of said second converter to measure, when the shaft of said first converter is braked, change in magnitude of the variable.

References Cited in the file of this patent

UNITED STATES PATENTS

| | | |
|---|---|---|
| 2,120,951 | Hodgman | June 14, 1938 |
| 2,121,054 | Satterlee | June 21, 1938 |
| 2,389,939 | Sparrow | Nov. 27, 1945 |
| 2,446,546 | Meston | Aug. 10, 1948 |
| 2,614,237 | Goertz | Oct. 14, 1952 |